(12) United States Patent
Laursen

(10) Patent No.: US 8,226,316 B2
(45) Date of Patent: Jul. 24, 2012

(54) METHOD AND APPARATUS FOR APPLYING INSECT REPELLANT

(76) Inventor: Christopher J. Laursen, Oviedo, FL (US)

( * ) Notice: Subject to any disclaimer, the term of this patent is extended or adjusted under 35 U.S.C. 154(b) by 992 days.

(21) Appl. No.: 12/205,166

(22) Filed: Sep. 5, 2008

(65) Prior Publication Data

US 2010/0061791 A1 Mar. 11, 2010

(51) Int. Cl.
*A47K 7/02* (2006.01)
*B43K 8/10* (2006.01)
(52) U.S. Cl. .............. 401/201; 401/8; 401/196
(58) Field of Classification Search ............ 401/6–8, 401/118, 200, 201, 196; 206/361, 438, 440, 206/466–468, 470
See application file for complete search history.

(56) References Cited

U.S. PATENT DOCUMENTS

| 3,608,708 | A | * | 9/1971 | Storandt | 401/7 |
| D363,810 | S | * | 10/1995 | Smith, Jr. | D28/63 |
| 6,015,242 | A | * | 1/2000 | Gillis | 401/201 |
| 6,499,901 | B1 | * | 12/2002 | Rabbani | 401/201 |
| 7,537,111 | B2 | * | 5/2009 | Hart et al. | 206/361 |
| 2005/0145518 | A1 | * | 7/2005 | Hong | 206/361 |

* cited by examiner

*Primary Examiner* — Tuan N Nguyen
(74) *Attorney, Agent, or Firm* — McKinney Law, PLLC

(57) ABSTRACT

A method and apparatus for applying insect repellant is disclosed. In a particular embodiment, the method includes filling a bag with powder, joining a bottom edge of the bag to a bottom edge of a sleeve adapted to removably cover the bag, and patting the bag over surface areas releasing the insect repellant in a desired quantity. The method includes providing a bag handle secured to a top edge of the bag and adapted to be grasped by a user to slide the sleeve down and pull the bag out. The sleeve is adapted to be grasped by the user when patting the bag over surface areas releasing the insect repellant. The method further includes providing a sleeve handle secured to the sleeve and adapted to be grasped by a user when sliding the sleeve back up over the bag.

18 Claims, 2 Drawing Sheets

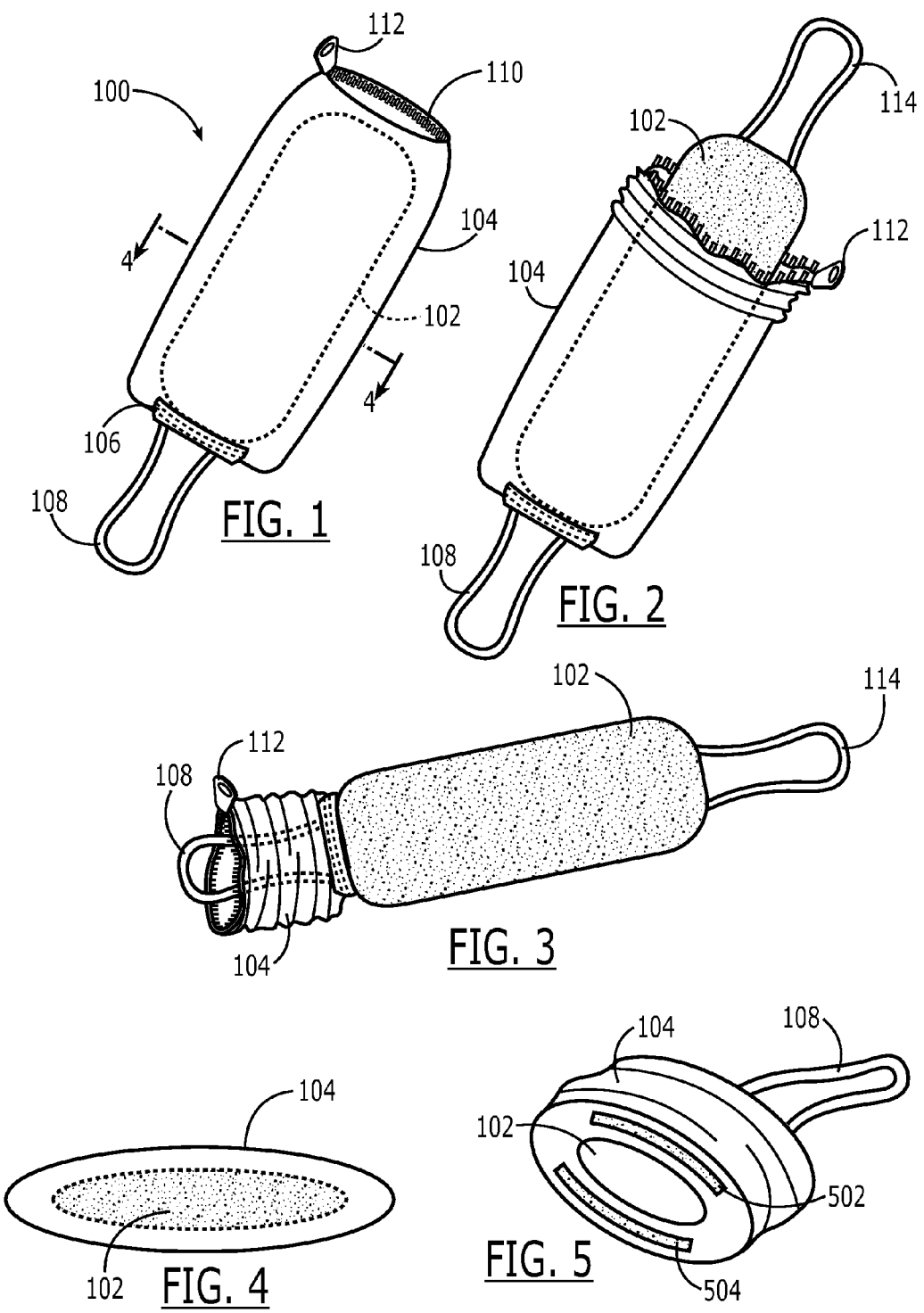

METHOD AND APPARATUS FOR APPLYING INSECT REPELLANT

I. FIELD

The present disclosure is generally related to a method and apparatus for applying insect repellant.

II. DESCRIPTION OF RELATED ART

Persons who hike and walk through wooded areas are susceptible to being infested by various types of insects. For example, mosquitoes, tics and red bugs. The typical insect repellant for mosquitoes and tics is usually not effective on red bugs. A chigger or red bug is a larva of the harvest mite. The harvest mite life cycle includes larva, nymph, and adult. In the last two stages, the harvest mite feeds on plant materials. The larval stage of the harvest mite affects humans the most because this is the stage that causes intense itching. The larvae, also called the chigger, will infest humans and other animals usually when walking in tall grass or other such undergrowth.

The chigger has a mouthpart similar to that of a tick and uses this mouthpart for feeding. However, chiggers do not feed on blood. Instead, a chigger's saliva will at first harden the walls of the hole made by its mouthpart. This hardening forms a stylostome that serves as a tube for the chigger to use for feeding and prevents the skin from closing off the hole made by the chigger. Next, the saliva is injected by the chigger through the stylostome to liquefy skin cells which the chigger uses for food. It is the stylostome that irritates and inflames the surrounding tissue and causes the characteristic red welt and itch. Itching usually intensifies twenty-four to forty hours after the initial contact with the chigger. The stylostome remains imbedded in the skin tissue even after the chigger is gone. Nonetheless, the skin may continue to itch for many days until the stylosome is eventually absorbed by the body from a week to ten days, or longer.

A chigger is too small to see with the naked eye but a group of chiggers can be visible when they congregate on ankles, waist or other body area. These areas are preferred by the chigger because the skin is thinner and makes it easier for the chigger to penetrate the skin. When chiggers are grouped together in large numbers they appear red in color.

The first line of defense against chiggers is the right kind of clothing. Shorts, sleeveless shirts and sandals are all susceptible to leading to a chigger problem when worn in chigger infested areas. Tightly woven socks and clothes, long pants long sleeved shirts, and high shoes or boots are advisable to deter a chigger infestation in addition to tucking pant legs inside boots and buttoning cuffs and collars as tightly as possible to keep chiggers on the outside of the clothes.

Currently, certain types of regular mosquito repellents may have some initial effect to repel chiggers. Applying these products to exposed skin and around the edge of openings in clothes, such as cuffs, waistbands, shirt fronts and boot tops, will force chiggers to cross the treated line to get inside the clothes. However, to the extent that these repellents are successful in repelling chiggers, the mosquito repellants often are only potent for two to three hours and must be reapplied frequently.

Currently a known alternative treatment that may be considered the most effective and time proven repellent for chiggers is sulphur powder. Sulphur has been shown to be very effective in repelling chiggers and chiggers avoid sulphur. Powdered sulphur, called sublimed sulphur or flowers of sulfur, is available through most pharmacies. The powdered sulphur is dusted around the opening of pants, socks and boots. In addition, the powdered sulphur may be rubbed over the skin on legs, arms and waist.

A drawback of powdered sulphur is that it must remain dry otherwise the powdered turns to a messy paste. The prior art discloses application of the powdered sulphur using filling a sock with the powder and patting the sock over the desired areas. However, a sock is not convenient to carry and may be susceptible to moisture. Further, the powdered sulphur may shake out through the sock during transport. Accordingly, what is needed in the art is a convenient method and apparatus to carry powdered sulphur and for application as an insect repellant.

III. SUMMARY

In a particular embodiment, an apparatus for applying insect repellant is disclosed, the apparatus comprising a bag adapted to contain insect repellant and a sleeve adapted to removably cover the bag. The apparatus further includes an attachment means joining a bottom edge of the bag and an adjacent bottom edge of the sleeve, wherein the sleeve may have a top edge opposing the bottom edge of the sleeve and adapted to be opened or closed. In addition, the apparatus may include a sleeve handle secured to the seam and a bag handle secured to a second edge of the bag and opposing the first edge of the bag.

In another particular embodiment, a method of applying insect repellant is disclosed. The method includes filling a bag with insect repellant and joining a bottom edge of the bag to a bottom edge of a sleeve adapted to removably cover the bag. The method further includes patting the bag over surface areas releasing the insect repellant in a desired quantity when the sleeve is slid down from covering the bag. The sleeve is adapted to be grasped by the user when patting the bag over surface areas releasing the insect repellant. In addition, the method may further include providing a sleeve handle secured to the sleeve and adapted to be grasped by a user when sliding the cover up over the bag and a bag handle secured to a top edge of the bag and opposing the bottom edge of the bag that may be used to pull the bag out of the sleeve.

One particular advantage provided by embodiments of the method and apparatus of applying insect repellant is that the powdered sulphur is protected from moisture and remains dry for convenient and easy transport by a user, for example in a pant pocket. Another advantage provided by disclosed embodiments is that during application of the powdered sulphur, the powdered sulphur does not inadvertently cover a user's hands during application but can be applied in precise areas and amounts. Accordingly, the sulphur is easily applied to only those desired areas.

Other aspects, advantages, and features of the present disclosure will become apparent after review of the entire application, including the following sections: Brief Description of the Drawings, Detailed Description, and the Claims.

IV. BRIEF DESCRIPTION OF THE DRAWINGS

FIG. 1 is a front perspective view of a particular illustrative embodiment of an apparatus for applying insect repellant;

FIG. 2 is a front perspective view of a particular illustrative embodiment of the apparatus for applying insect repellant showing a sleeve pulled partially down from covering a bag containing insect repellant;

FIG. 3 is a perspective view of a particular illustrative embodiment of the apparatus for applying insect repellant showing the bag exposed and ready for applying the insect repellant stored therein;

FIG. 4 is a cross-sectional view of a particular illustrative embodiment of the apparatus for applying insect repellant shown in FIGS. 1-3;

FIG. 5 is a top view of a particular illustrative embodiment of the apparatus for applying insect repellant.

V. DETAILED DESCRIPTION

Figure 6:
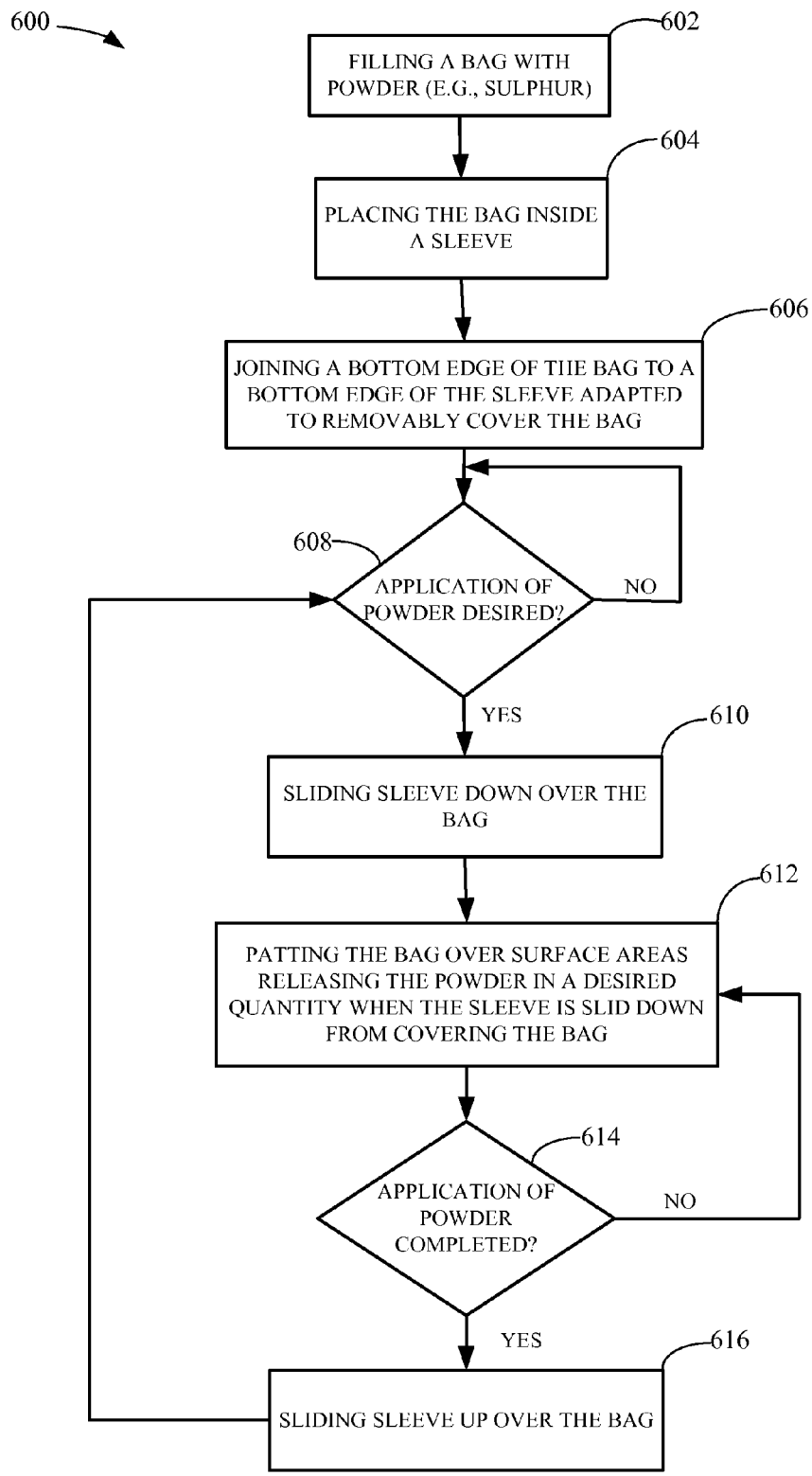
FIG. 6 is a flow diagram of a particular illustrative embodiment of a method of applying insect repellant.

Referring to FIG. 1, a particular illustrative embodiment of an apparatus for applying insect repellant is disclosed and generally designated 100. A bag 102 filled with insect repellant, for example sulphur powder to repel chiggers, is placed inside a sleeve 104. The sleeve 104 may be relatively larger in size than the bag 102 to facilitate the bag 102 being completely enclosed by the sleeve 104. The bag 102 may be comprised of a cotton material, or other type of material, with a sufficiently loose weave and flexibility to allow sulphur powder, for example, to pass through when using the apparatus in a patting motion. In a preferred embodiment, the bag 102 is filled with approximately one ounce of powder. However, the amount of powder may vary depending on the particular need and application. The sleeve 104 may be comprised of nylon or other types of flexible water resistant material. The sleeve 104 protects the bag 102 and prevents moisture from contacting the powder insect repellant contained within the bag 102. The sleeve 104 has a bottom edge that is attached to a first edge of the bag 102 using an attachment means 106.

The attachment means 106 may include a seam sewn to join the bag 102 and the sleeve 104 in a particular embodiment. The bag 102 may also be removably secured to the sleeve so that the bag 102 may be easily replaced when the powder within the bag 102 has been depleted or a different type of powder is desired to be used. Accordingly, the bag 102 may be secured to the sleeve 104 using an attachment means 106 of Velcro, snaps, or other type of removable attachment means 106 disposed on an outer surface of the bag 102, for example a loop material. Hook material may be opposingly disposed on the inner surface of the sleeve 104 to matingly engage the loop material on the bag 102 to secure the bag 102 within sleeve 104. The attachment means may further comprise Velcro, snaps, or other type of sealing means disposed on an inside surface of the bag 102 so that the bag 102 may be opened and refilled with powder then resealed using the attachment means 106, similar to the configuration described below in FIG. 5 related to hook material 502 and loop material 504 for the sleeve 104. The apparatus 100 is relatively small and lightweight and adapted to be easily carried in a user's pocket.

A top edge of the sleeve 104 may have a zipper 110 to open and close the sleeve 104 to access the bag 102. A zipper handle 112 is disposed on the zipper 110 to facilitate the use of the zipper 110. A sleeve handle 108 may be attached to the bottom edge of the sleeve 104 for a user to grasp for carrying and also to assist in sliding the sleeve 104 back up over the bag 102. The sleeve handle 108 and/or sleeve 104 may also be grasped by the user when patting the bag over surface areas. A zipper is quiet to operate when stealth is required, for example while hunting, compared to Velcro described in reference to FIG. 5, and a zipper is also easy to open and close in low lighting conditions.

Referring to FIG. 2, the top edge of the sleeve 104 is adapted to slide down or roll back on itself to reveal the bag 102, when the top edge of the sleeve 104 is in an open position. The zipper handle 112 is used to pull the zipper 110 open. A bag handle 114 is attached to a second edge of the bag 102 and is adapted to be grasped by a user when sliding the sleeve 104 down over the bag 102. The bag handle 114 prevents the powder insect repellant within the bag 102 from inadvertently contacting the user's hands when sliding or pulling the sleeve 104 in an opposing motion. The bag handle 114 is stored within the sleeve 104 and may not be visible when the sleeve 104 is in a closed position.

As shown in FIG. 2, the bag handle 114 is a strip material that forms a loop. In another embodiment, the bag handle 114 may be a tab, cord, or similar type of appendage to the bag 102 that allows the user to pull the bag 102 from the sleeve 104 without substantially contacting the bag 102 portion containing the powder. In the preferred embodiment, the bag handle 114 and sleeve handle 108 may be comprised of any flexible type material. In another embodiment, the bag handle 114 and sleeve handle may be comprised of a rigid material.

Referring now to FIG. 3, the sleeve 104 is turned inside out when slid completely down over the bag 102. The sleeve 104 may also be slid down partially or all the way without being turned inside out. A length of the sleeve handle 108 is sufficient so that the user may grasp the sleeve handle 108 to assist in sliding the sleeve 104 up over the bag 102 in an opposing motion. The size of the bag 102 may vary depending on the type of insect repellant desired and specific application. A cross section of the apparatus 100 is shown in FIG. 4. The sleeve 104 may be larger in diameter than the bag 102 to facilitate easily sliding the bag 102 into the sleeve 104.

FIG. 5 is a particular alternative embodiment showing Velcro used to secure the top edge of the sleeve 104. Velcro hook material 502 is disposed on an inside edge of the sleeve 104 and the Velcro loop material 504 is disposed on an opposing inside edge of the sleeve 104. Accordingly, the top edge of the sleeve 104 may be easily opened and closed by grasping each side of the top edge of the sleeve 104 and pulling in an opposing motion to separate the Velcro and open the top edge of the sleeve 104. Similarly, to close the top edge of the sleeve 104, both edges of the sleeve 104 are pushed together to form a temporary closure and secure the bag 102 inside.

Referring to FIG. 6, a particular illustrative embodiment of a method of applying insect repellant is disclosed and generally designated 600. A bag is filled with powder at 602. The powder may be sulphur to repel chiggers or other types of powder insect repellant. The bag is placed inside a sleeve at 604 that serves to prevent moisture from contacting the powder within the bag. In addition, a bottom edge of the bag is joined to a bottom edge of the sleeve at 606. By joining the bag and sleeve together at the bottom edge serves to keep the bag and sleeve from being completely separated and potentially lost. Also, joining the bag and sleeve together at the bottom edge also serves to allow the sleeve to be easily slid down over the bag completely.

When a user desires to apply the powder at 608, the sleeve is slid down over the bag at 610 and the powder is applied by patting the bag over surface areas causing the powder to be released from the bag in a desired quantity at 612. When the user has completed application of the powder at 614, the sleeve may be slid up over the bag at 616 until another application is desired. A common area to apply sulphur powder to repel chiggers is around a user's ankles, waist and underarms. The powder may also be applied liberally over clothes.

Other uses for the apparatus include but are not limited to, make-up application, medical purposes, food preparation, or any other type of application where powder is required to be applied. The present invention provides for a convenient method and apparatus to store powder and to apply powder as needed.

The previous description of the disclosed embodiments is provided to enable any person skilled in the art to make or use the disclosed embodiments. Various modifications to these embodiments will be readily apparent to those skilled in the art, and the principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims.

What is claimed is:

1. An apparatus for applying powder, the apparatus comprising:
    a bag configured to contain powder, wherein a material of the bag allows the powder to pass through when using the apparatus in a patting motion;
    a sleeve configured to removably cover the bag to prevent moisture from contacting the powder when the sleeve is slid over the bag and the sleeve is configured to slide down to reveal the bag when applying the powder; and
    an attachment means joining a bottom edge of the bag and an adjacent bottom edge of the sleeve.

2. The apparatus of claim 1, further comprising a sleeve handle secured to the sleeve.

3. The apparatus of claim 2, further comprising a bag handle secured to a top edge of the bag and opposing the bottom edge of the bag.

4. The apparatus of claim 3, wherein the sleeve having a top edge opposing the bottom edge of the sleeve and the top edge adapted to be opened or closed.

5. The apparatus of claim 4, further comprising a zipper disposed on the top edge of the sleeve.

6. The apparatus of claim 1, wherein the sleeve material comprising nylon material.

7. The apparatus of claim 1, wherein the bag material comprising cotton material.

8. The apparatus of claim 1, wherein the powder is insect repellant.

9. The apparatus of claim 8, wherein the powder is sulfur.

10. A method for applying powder, the method comprising:
    filling a bag with powder, wherein a material of the bag allows the powder to pass through when using the apparatus in a patting motion;
    attaching a bottom edge of the bag to a bottom edge of a sleeve configured to removably cover the bag to prevent moisture from contacting the powder when the sleeve is slid over the bag; and
    patting the bag over surface areas releasing the powder in a desired quantity when the sleeve is slid down from covering the bag.

11. The method of claim 10, further comprising providing a sleeve handle secured to the sleeve and configured to be grasped by a user when sliding the sleeve over the bag.

12. The method of claim 11, further comprising providing a bag handle secured to a top edge of the bag and opposing the bottom edge of the bag and configured to be grasped by the user when patting the bag over surface areas releasing the powder.

13. The method of claim 12, wherein the sleeve having a top edge opposing the bottom edge of the sleeve and the top edge configured to be closed to secure the bag therein.

14. The method of claim 13, further comprising providing a zipper disposed on the top edge of the sleeve and configured to open and close the top edge of the sleeve.

15. The method of claim 10, wherein the sleeve material comprising nylon material.

16. The method of claim 10, wherein the bag material comprising cotton material.

17. The method of claim 10, wherein the bag contains powder insect repellant.

18. The method of claim 17, wherein the powder insect repellant is sulfur.

* * * * *